(12) United States Patent
Ajiro

(10) Patent No.: US 7,181,564 B2
(45) Date of Patent: Feb. 20, 2007

(54) DATA PROCESSING APPARATUS AND DATA PROCESSING METHOD

(75) Inventor: Kazuyoshi Ajiro, Kanagawa (JP)

(73) Assignee: NEC Electronics Corporation (JP)

( * ) Notice: Subject to any disclaimer, the term of this patent is extended or adjusted under 35 U.S.C. 154(b) by 284 days.

(21) Appl. No.: 10/449,957

(22) Filed: May 30, 2003

(65) Prior Publication Data
US 2003/0225963 A1 Dec. 4, 2003

(30) Foreign Application Priority Data
Jun. 4, 2002 (JP) .............................. 2002/163361

(51) Int. Cl.
*G06F 13/10* (2006.01)
(52) U.S. Cl. .................. 711/103; 711/165; 710/260
(58) Field of Classification Search ................ 711/129, 711/165, 122, 130, 141–142, 147, 152, 151, 711/103; 365/185.33; 710/260
See application file for complete search history.

(56) References Cited

U.S. PATENT DOCUMENTS 5,794,054 A * 8/1998 Le et al. ..................... 710/240
5,951,655 A * 9/1999 Inoue .......................... 710/37
6,782,448 B2 * 8/2004 Goodman et al. ........... 711/112

FOREIGN PATENT DOCUMENTS

JP      10-20906      1/1998

OTHER PUBLICATIONS

Russ Hersch, Embedded Processor and Microcontroller primer and FAQ, Sep. 11, 1997, section4.4.*
Intel, MCS-51 Microcontroller Family User's Manual, Feb. 1994, Intel Corporation, pp. 2-58, 2-59, 3-28.*

* cited by examiner

*Primary Examiner*—Brian R. Peugh
*Assistant Examiner*—Jared Rutz
(74) *Attorney, Agent, or Firm*—Ostrolenk, Faber, Gerb & Soffen, LLP

(57) ABSTRACT

When reading out flash ROM data from an external interface circuit, a clock for a CPU is stopped only in a period during which the flash ROM is read out and fetch data at the CPU side are held in a fetch bus interface; thereafter, an address of the data that are desired to be read out for the flash ROM is output and the data are taken in. When rewriting into the flash ROM, a fetch target from the CPU is switched to a tuning RAM that stores a copy of the data for a rewrite region, and during that period, data rewrite of the flash ROM is carried out. Reading and writing of the flash ROM data from outside is made possible while the CPU is kept in operation.

18 Claims, 6 Drawing Sheets

DATA PROCESSING APPARATUS AND DATA PROCESSING METHOD

BACKGROUND OF THE INVENTION

1. Field of the Invention

The present invention relates to a data processing apparatus furnished with a non-volatile memory and to a data processing method, and more particularly to a data processing technology used for engine control.

2. Description of the Prior Art

When developing electronic control unit (hereafter, abbreviated as ECU) of an automobile, it is necessary to tune parameters for programs and data that are stored in internal flash ROMs (Flash Read Only Memories) which are used for controlling systems so that it is possible to obtain desired characteristics.

Conventional tuning methods employ a method in which a single chip microcomputer having a parallel input/output port or a serial input/output port is operated in a dedicated mode to rewrite the flash ROM. However, the conventional methods have problems in that, because they are not provided with the function for performing rewriting the flash ROM when an ECU is actually operating, the flash ROM cannot be rewritten when the ECU is actually operating. If it becomes possible to rewrite data and correct programs instantly in environmental conditions where experimental environments are difficult to reproduce, it becomes easy to obtain targeted characteristics.

In view of these, Japanese Unexamined Patent Publication No. 10-020906 discloses a data processing system that enables quick tuning without necessitating shutdown of operating power supply or shutdown of the computer system in data processing used for engine control when developing engines.

FIG. 1 shows a block diagram of a prior art data processing apparatus described in the foregoing publication. This data processing apparatus 109 has a central processing unit (hereinafter, abbreviated as CPU) core 101 for executing a control program, a PROM (Programmable Read Only Memory) 102 in which a control program and a control parameter are stored in advance, a RAM (Random Access Memory) 103, a data transfer means 104 for transferring data from an external terminal 100 to the RAM 103, a register 105 that stores the transfer addresses, and a comparator 106 that can be switched between an operating state and a non-operating state and compares a value in the register 105 and an address value which is output from the CPU core 101, all of which are connected to one another through a data bus 107 and an address bus 108. The data transfer means 104 has a serial transmitter 112, a direct memory access (DMA) 113, and a decoder 114.

When data tuning is performed by reading a new control parameter from outside into this data processing apparatus, command data indicating writing to the RAM, RAM address data, and new parameter data are first inputted to the external terminal 100. When these data are read by the serial transmitter 112, the decoder 114 judges from the read data that a control parameter has been read. As a result, the comparator 106 enters a non-operating state, and the RAM address and the new parameter data are passed to the DMA 113.

Upon receiving the new parameter data, the DMA 113 requests bus ownership to the CPU 101. After having been granted the bus ownership, the DMA 113 makes a RAM selecting-signal 110 valid and a PROM-selecting signal 111 invalid irrespective of the state of the comparator 106, and writes the control parameter into an aimed address in the RAM 103.

After having written data, the DMA 113 restores the RAM selecting-signal 110 and the PROM-selecting signal 111 to their original states, tells the CPU core 101 of its relinquishment of the bus ownership, and instructs the serial transmitter 112 to read the next data. The new control parameter is written into the RAM 103 by repeating these steps.

When the CPU core 101 attempts, under this condition, to access a region in which control parameters are stored, the CPU core 101 accesses a region of the RAM 103 in which the new parameter is written, not a region of the PROM 102; thus engine control is carried out. If the control parameter needs to be further changed to continue the tuning, the control parameter can be changed one after another during operation-by performing a similar operation such that new control parameters are read from outside into the RAM.

Accordingly, when developing, for example, an ECU, it becomes possible to optimize programs and data tables under conditions in which reproduction is difficult in actual operating environments. In addition, it becomes possible to instantly rewrite data and correct programs under conditions in which reproduction is difficult.

The conventional data processing system depicted in FIG. 1 makes it possible to change parameter data even during the operation of the CPU core and to perform quick tuning without shutting down the operating power supply for the CPU core or shutting down the computer system, because the CPU core 101 is configured such that, when the RAM 103 is rewritten and a data store address is output during the operation of the CPU core 101, the CPU core 101 refers to the data stored in the RAM 103 in place of the data stored in the PROM 102 to execute programmed operations. However, the new control parameter stored in the RAM 103 needs to be written again into the PROM 102 after the tuning is completed. For this reason, the operation is cumbersome and errors tend to occur.

Moreover, since the RAM 103 temporarily stores all the control parameters that are changed by the time the tuning is completed, a large capacity memory region is required for the RAM 103, which is undesirable.

SUMMARY OF THE INVENTION

The present invention has been accomplished in view of the foregoing circumstances, and it is an object of the present invention to provide a data processing means by which it is made possible to, using a relatively small capacity RAM, change parameter data while the CPU is kept in operation, and which performs quick tuning without shutting down the operating power supply or shutting down the computer system and does not need to rewrite new control parameters into a PROM (for example, a flash ROM) after the completion of the tuning.

It is another object of the present invention to provide a means that is capable of reading the data stored in the flash ROM to outside while the CPU is kept in operation.

These objects are accomplished in accordance with the present invention by providing a data processing apparatus including: a CPU for executing a program for performing data processing; a rewritable non-volatile memory for storing data that are to be referred to at the time of the data processing; a RAM for storing data in a rewrite target region when rewriting the data stored in the non-volatile memory while the CPU is in operation; an external interface circuit for interfacing transfer of a control signal and data when the non-volatile memory is accessed from outside while the CPU is in operation; and a fetch bus interface circuit that is connected between the CPU, the non-volatile memory, and the external interface circuit, has a data holding circuit therein capable of holding data which are read out from the non-volatile memory, and controls, according to the control signal, a switching of a fetch bus between the non-volatile memory and the RAM when the non-volatile memory is accessed from outside while the CPU is in operation.

The present invention also provides a data processing method for a data processing apparatus comprising a CPU for executing a program for performing data processing, and a rewritable non-volatile memory for storing data that are referred to at the time of the data processing, in which the non-volatile memory is permitted to be read from outside while the CPU is in operation, the method comprising the steps of: stopping an operating clock for the CPU when a command indicating data read-out to the non-volatile memory and an address value are inputted from outside; holding, in a data holding circuit, the data being output from the non-volatile memory at the time when the operating clock is stopped; reading and outputting data to outside by supplying the address value to the non-volatile memory during the period in which the operating clock for the CPU is stopped; resuming the supply of the operating clock for the CPU; supplying the data held in the data holding circuit to the CPU; and switching a data supply source for the CPU to the non-volatile memory side.

The present invention further provides another data processing method for a data processing apparatus comprising a CPU for executing a program for performing data processing, and a rewritable non-volatile memory for storing data that are referred to at the time of the data processing, in which the non-volatile memory is permitted to be rewritten from outside while the CPU is in operation, the method comprising the steps of: storing data that are stored in a rewrite target region in the non-volatile memory into a predetermined storage region in the RAM that is provided separately from the non-volatile memory; inputting an address of the rewrite target region in the non-volatile memory and a control signal from outside; switching a target of fetching by the CPU to the predetermined storage region in the RAM; performing data writing into the rewrite target region in the non-volatile memory; and returning the target of fetching by the CPU to the non-volatile memory side after the data writing to the non-volatile memory is completed.

The foregoing and other related objects and features of the present invention will become apparent by reading the following detailed description of illustrative embodiments taken in conjunction with the accompanying drawings and the novel features of the invention set forth in the appended claims.

BRIEF DESCRIPTION OF THE DRAWINGS

For better understanding of the drawings referred in the detailed description of the present invention, the appended drawings are now briefly described, in which.

DETAILED DESCRIPTION OF THE PREFERRED EMBODIMENTS

Hereinbelow, preferred embodiments of the present invention are described in detail with reference to the appended drawings. It should be noted that the following description illustrates exemplary embodiments of the present invention, and that the present invention should not be construed as limited to the following description.

Figure 2:
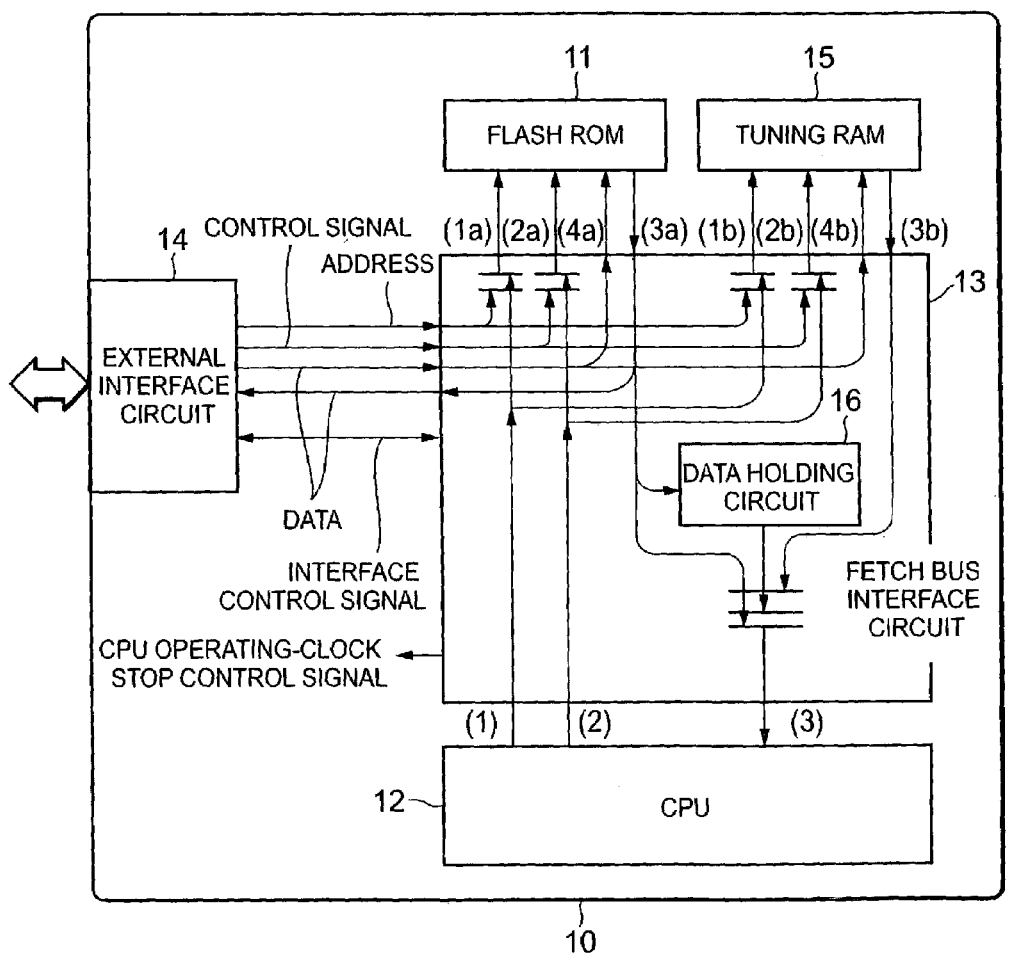
FIG. 2 is a block diagram of a data processing apparatus showing an embodiment of the present invention.

FIG. 2 is a block diagram of a data processing apparatus showing one embodiment of the present invention.

A data processing apparatus according to the present embodiment is constructed as a single chip microcomputer 10 within an ECU and is furnished with a flash ROM 11 for storing a program, a CPU 12, a fetch bus interface circuit 13, an external interface circuit 14, and a tuning RAM 15.

Figure 1:
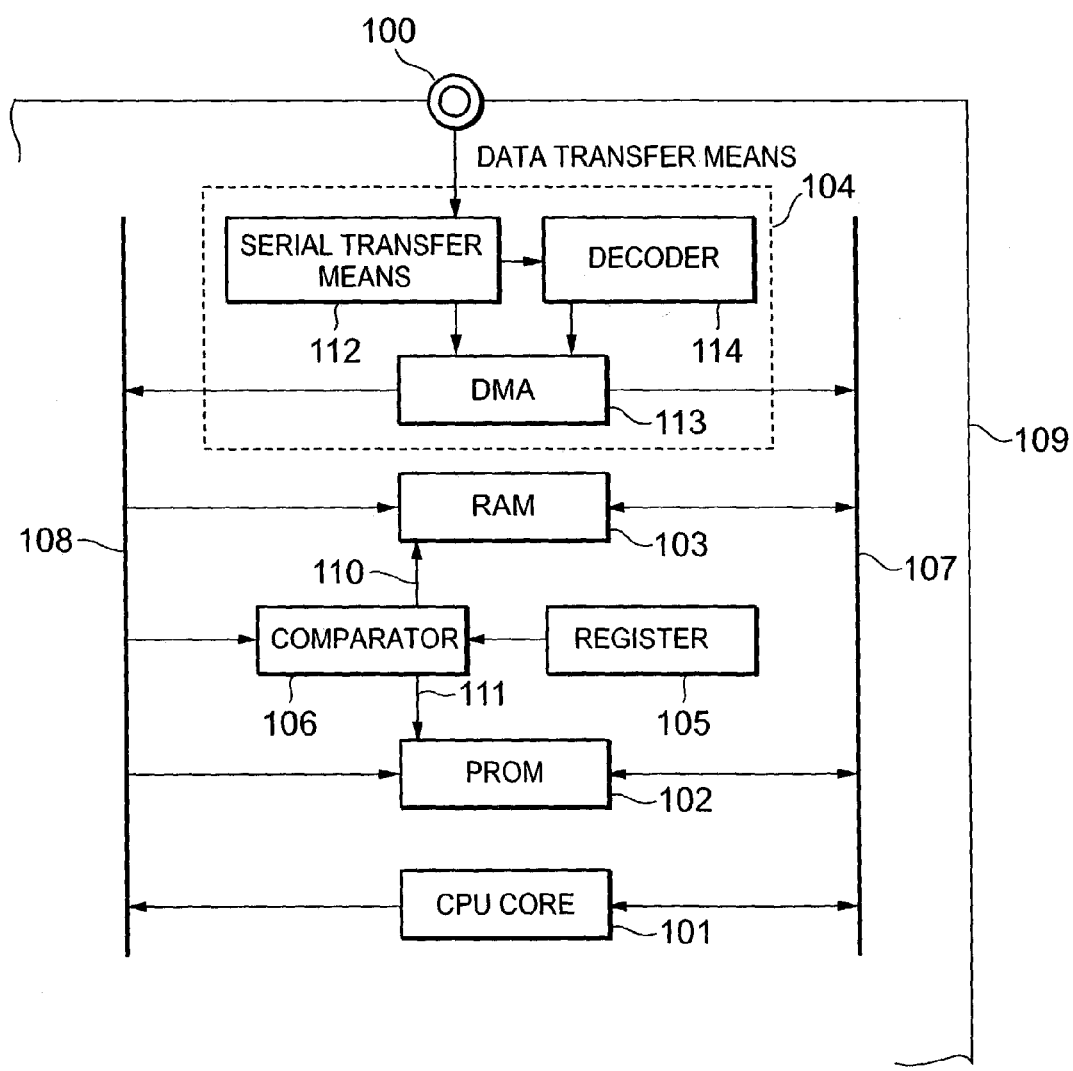
FIG. 1 is a block diagram showing a prior art example.

The tuning RAM 15 has similar functions to those of the tuning RAM 103 shown as the prior art example of FIG. 1, but in the case of the present embodiment, this tuning RAM 15 stores, at the time when writing new data into the flash ROM 11, pre-writing control parameters that are stored in a storage region in the flash ROM 11 into which the new data are written. Accordingly, while new data are being written into the flash ROM 11, the CPU 12 accesses the tuning RAM 15 and reads out the control parameter stored in the tuning-RAM 15 before that writing so that the data processing is continued.

In the present embodiment, respective blocks are connected as described below.

Signals between the CPU 12 and the fetch bus interface circuit 13 include an address output (1) from the CPU 12 for fetching a program and accessing data, a control signal output (2) from the CPU 12 for controlling the state of the fetch bus, an output (3) of program data and read data from the tuning RAM 15 and the flash ROM 11 to the CPU 12.

Signals between the fetch bus interface circuit 13 and the flash ROM 11 include an address output (1*a*) for fetching a program and accessing data; a control signal output (2*a*) for controlling the state of the fetch bus, read data and program data (3*a*) from the flash ROM 11, and data (4*a*) to be written into the flash ROM 11 via the external interface circuit 14.

Signals between the fetch bus interface circuit 13 and the tuning RAM 15 include address output (1*b*) for fetching a program and accessing data, a control signal output (2*b*) for controlling the state of the fetch bus, data (3*b*) of a program or the like that is read out from the tuning RAM 15, and data (4*b*) to be written into the tuning RAM 15 via the external interface circuit 14.

Signals between the fetch bus interface circuit 13 and the external interface circuit 14 include an address for reading and writing the flash ROM 11, a signal group for generating a control signal in the fetch bus interface circuit 13, data read from the flash ROM 11, data to be written into the flash ROM 11 or the tuning RAM 15.

In addition to these, the fetch bus interface circuit 13 outputs a control signal for stopping the operating clock for the CPU 12 (CPU operating-clock stop control signal).

Figure 3:
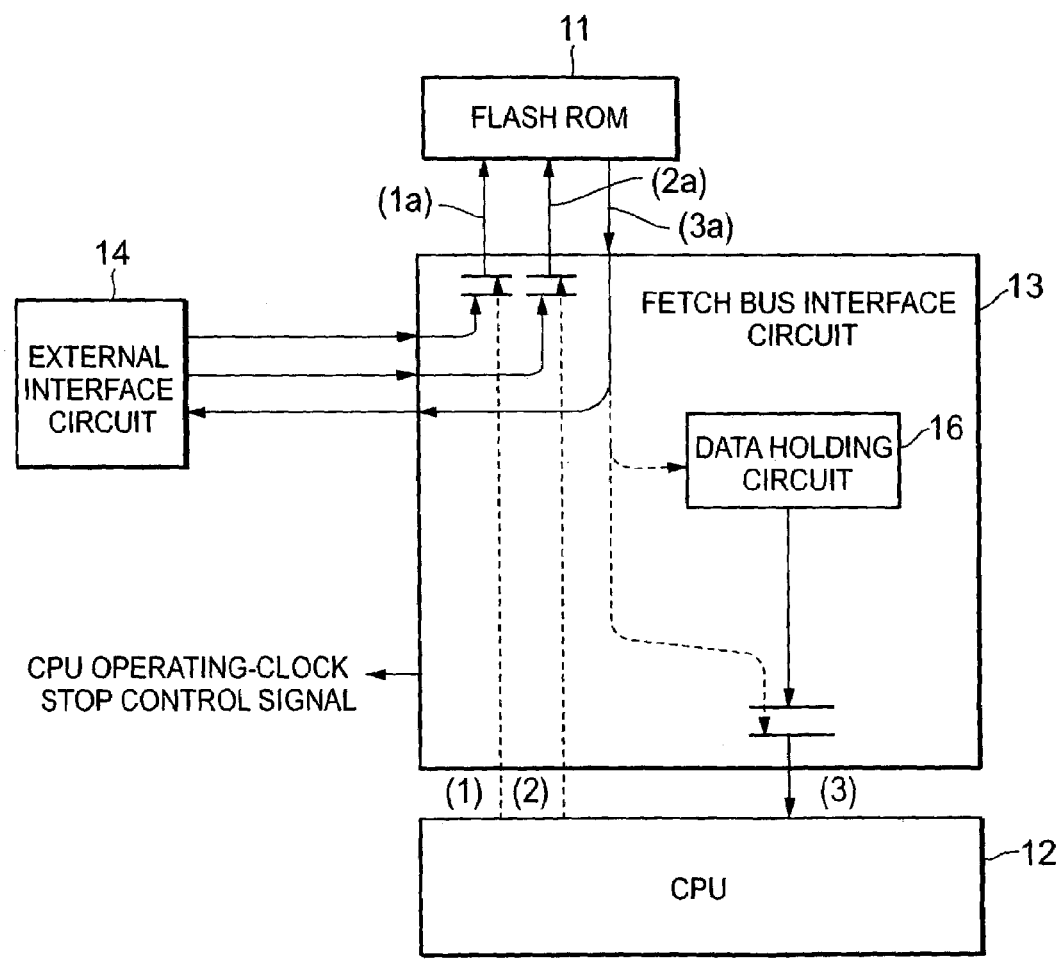
FIG. 3 is a diagram showing the flows of signals when data in a flash ROM are read from outside.

FIG. 3 is a diagram showing the signal flows at the time when data in the flash ROM 11 are read in the present embodiment. When a data read operation in the flash ROM 11 is performed, data communication is carried out from outside the ECU via the external interface circuit 14 of the single chip microcomputer 10 in the ECU.

A command indicating read-out and an address value in the flash ROM 11 into which read-out is desired are transmitted to the external interface circuit 14. In response to the input of the command and the address value, the external interface circuit 14 generates an address signal (1*a*) and a control signal (2*a*) that are necessary for the data read into the flash ROM 11. Data (3*a*) that are output from the flash ROM 11 are taken into the external interface circuit 14 and output to the outside of the ECU, and thereby, a user can obtain the data from the flash ROM 11. It should be noted that in this operation, the system clock for the CPU 12 is stopped.

Figure 4:
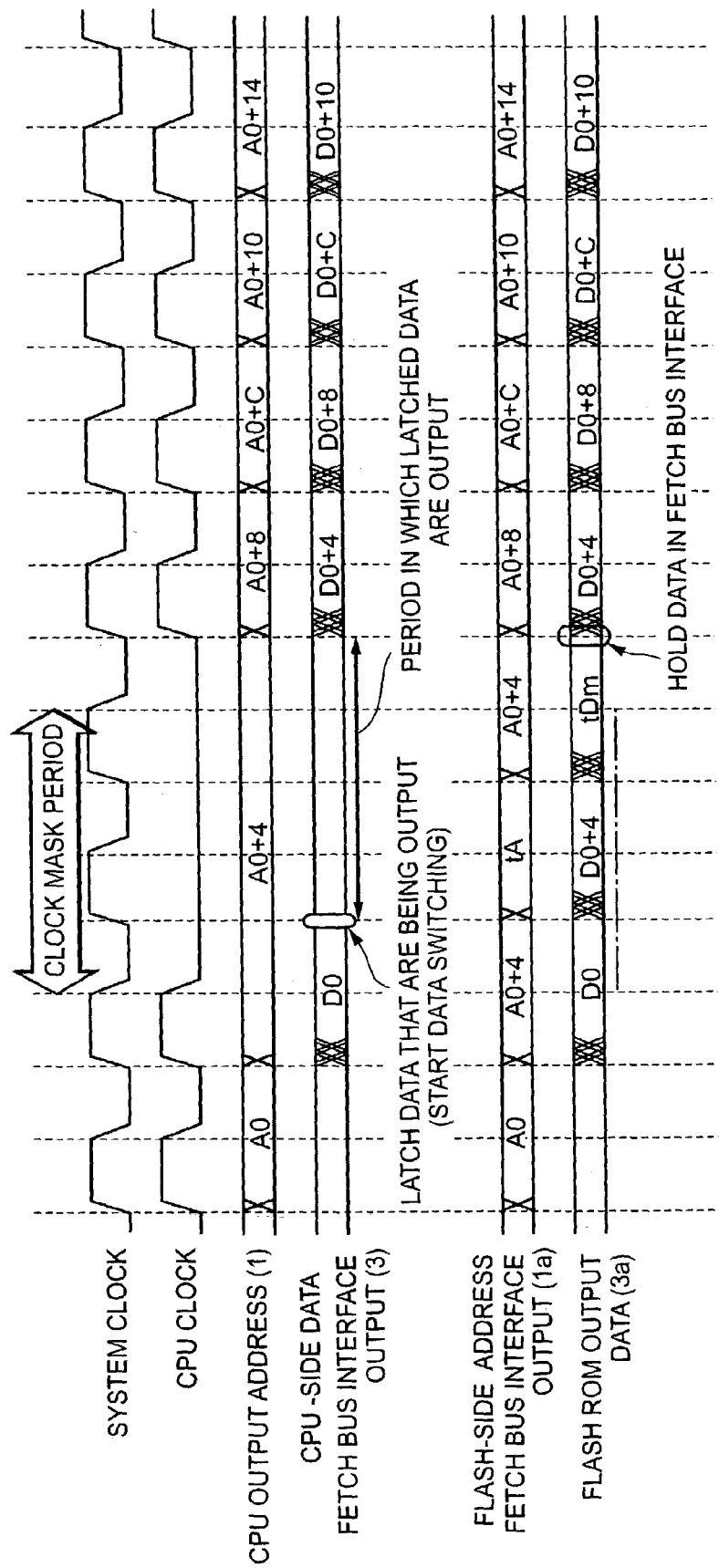
FIG. 4 is a diagram showing timings when data in a flash ROM are read from outside while a CPU is kept in operation.

FIG. 4 is a diagram showing the timing when data in the flash ROM 11 are read out to outside under the condition in which the CPU 12 is in operation. In the following, details of a data read operation in the flash ROM 11 are described with reference to FIGS. 3 and 4.

The system clock is supplied at all times when the single chip microcomputer 10 is in operation, except in the case of a particular operation mode. When the external interface circuit 14 receives the command and the address value indicating reading of the data in the flash ROM 11, the fetch bus interface circuit 13 outputs a signal for stopping the clock supplied to the CPU 12 to mask the clock for the CPU 12, stopping the supply of the clock.

At the same time as this stop of the clock, a data value (D0+4) that has been output from the flash ROM 11 is held in a data holding circuit 16 inside the fetch bus interface circuit 13. The fetch bus interface circuit 13 switches the data supply source to the CPU 12 from the flash ROM 11 to the data holding circuit 16 so that no problem will occur in the CPU operation after the supply of the clock for the CPU 12 is resumed. During the period in which the clock for the CPU 12 is stopped, a data value (D0) is held, which is being output to a latch circuit (not shown in the figure) provided at an output portion in the fetch bus interface circuit 13 that is the output to the CPU 12; then, immediately after the supply of the clock is resumed, the output from the data holding circuit 16 is selected, and the data value (D0+4) is output.

Then, the fetch bus interface circuit 13 switches the address for the flash ROM 11 and the control signal during the period in which the clock is stopped, and supplies an address (tA) into which read-out is desired. Data output from the flash ROM 11 is completed, and the data (tDm) is taken in at the external interface circuit 14. Thereafter, the fetch bus interface circuit 13 gives an instruction to resume the supply of the clock for the CPU 12, and also switches the data supply source to CPU 12 from the data holding circuit 16 to the flash ROM 11 side.

By repeatedly performing these series of operations, data stored in a predetermined address region inside the flash ROM 11 can be read out to outside while the control operation is kept performed by the CPU 12.

Therefore, the system clock is supplied at all times to the circuit of the present invention, the flash ROM 11, and the function blocks in the single chip microcomputer 10 that are guaranteed to operate even when the CPU is stopped, but a clock that is controlled by a CPU operating-clock stop control signal is supplied to the CPU 12.

Figure 5:
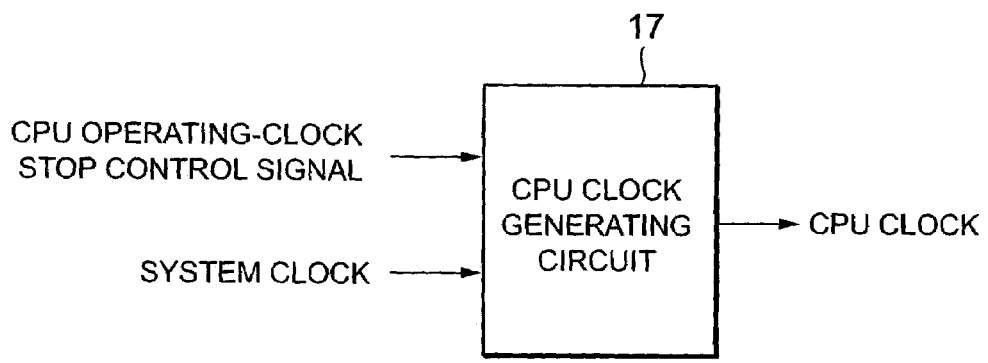
FIG. 5 is a block diagram showing a circuit that generates a clock supplied to the CPU.

FIG. 5 is block diagram showing a clock generating circuit for the CPU 12. This CPU clock-generating circuit 17 carries out such an-operation that it outputs the system clock to the CPU 12 as the clock for the CPU during the normal control operation but it stops outputting the system clock during the period in which the CPU operating-clock stop control signal is inputted from the fetch bus interface circuit 13; it is constructed by, for example, an AND gate or the like.

Figure 6:
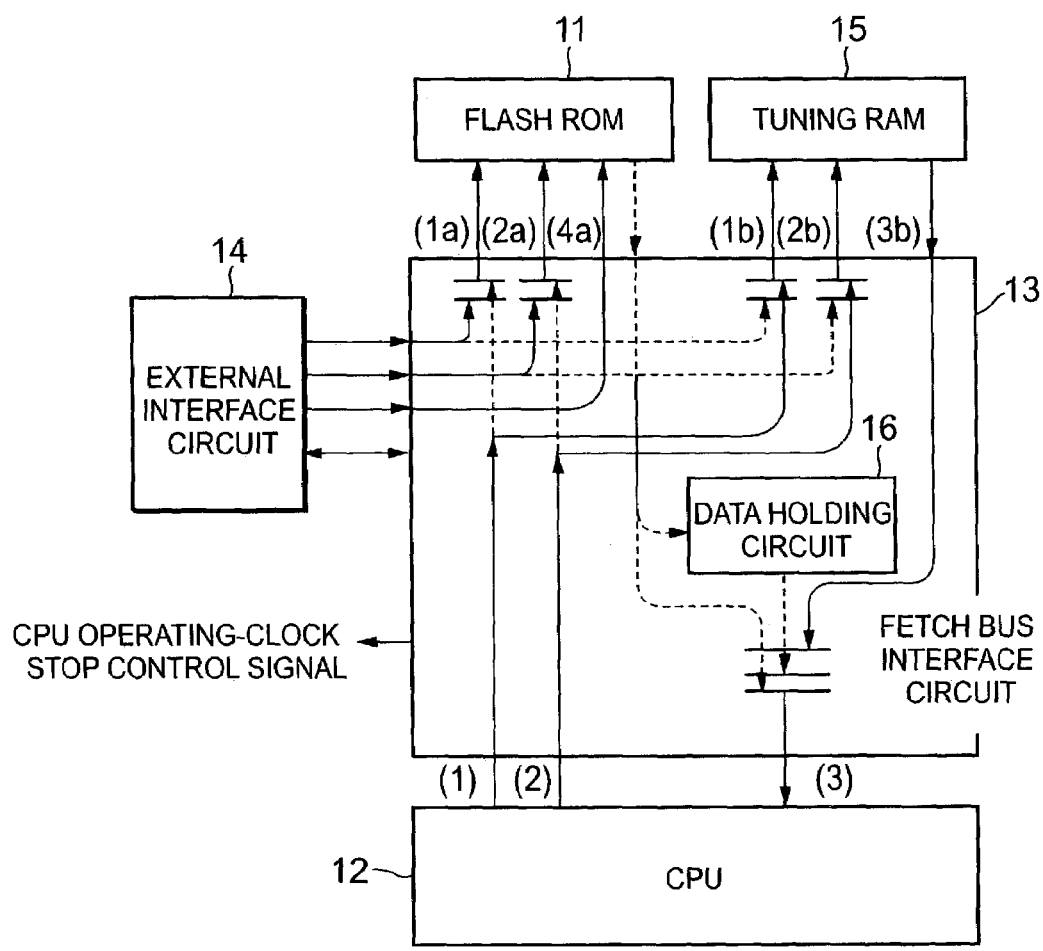
FIG. 6 is a diagram showing the flows of signal at the time of data writing to the flash ROM.

FIG. 6 is a diagram showing the signal flow at the time of data writing-to the flash ROM 11. In the following, a data write operation to the flash ROM 11 in accordance with the present embodiment is described with reference to FIG. 6.

If the flash ROM 11 is written from outside while the CPU 12 is performing a data processing, the CPU 12 cannot perform fetching and data reading from the flash ROM 11 because the writing from outside conflicts with the ROM data reading in the internal operation by the CPU 12. The present embodiment resolves the conflict in the following manner.

First, the data in a region of the flash ROM 11 that is desired to be rewritten are transferred via the external interface circuit 14 and written into this tuning RAM 15 in advance. This write operation is performed in a similar manner to the data write operation to the RAM 103 in the prior art example of FIG. 1. In the present embodiment, however, the data to be written into the tuning RAM 15 are the same data as the data that is currently stored in a region of the flash ROM 11 that is desired to be rewritten.

Specifically, by a data read operation in the flash ROM 11, the data in a target region of the flash ROM 11 that is desired to be rewritten are read outside, and the read data in the target region are then used as data to be written into the tuning RAM 15 via the external interface circuit 14.

After the data of the target region of the flash ROM 11 that is desired to be rewritten have been transferred and written into the tuning RAM 15, the fetch bus interface circuit 13 switches the input destination of the address for the flash ROM 11 and the control signal to the external interface circuit 14 side, in order to rewrite the data of the flash ROM 11. Next, the fetch bus interface circuit 13 switches the target of fetching by the CPU 12 to the tuning RAM 15 side. Accordingly, while the data in the flash ROM 11 are being rewritten, the CPU 12 accesses the tuning RAM 15 and reads out the control parameter that is stored in the tuning RAM 15 before writing to perform data processing. As a result, it becomes possible for the CPU 12 to read out the control parameter stably from the tuning RAM 15 even while the flash ROM 11 is being rewritten.

The fetch bus interface circuit 13 switches the address for the flash ROM 11 and the control signal to the external interface circuit 14 side. This makes it possible to write new data into the flash ROM 11 from outside. The writing to the flash ROM 11 is carried out in a similar manner to the writing to the PROM in the prior art example of FIG. 1.

As soon as the writing to the flash ROM 11 is completed, the fetch bus interface circuit 13 puts the target of fetching by the CPU 12 back to the flash ROM 11. After this operation is completed, due to that the CPU 12 performs reading from the flash ROM, the CPU can perform data processing using a new program or new data.

It should be noted that the fetch bus interface circuit 13 may be configured so as to perform a series of operations performed until the target of fetching by the CPU 12 is returned to the flash ROM 11 subsequent to the completion of the rewriting, including the operation in which, by inputting an address value and a command indicating data rewriting to the flash ROM 11, the rewriting target data read out from the address of the flash ROM 11 that is indicated by the address value are output to the external interface circuit 14 and are written into a predetermined storage region of the tuning RAM 15.

In the present embodiment, only the data in the target region of the flash ROM 11 that is desired to be rewritten are stored in the tuning RAM 15. Accordingly, in cases where the data stored in another region of the flash ROM 11 are to be rewritten, the data of the target region stored in the tuning RAM 15 are erased and the tuning RAM, 15 is overwritten by the data stored in another region of the flash ROM 11. Since the storage region of the tuning RAM 15 can be reused in this manner, the tuning RAM 15 can be realized with a RAM having a relatively small storage capacity.

It should be noted that in the foregoing embodiment, a flash ROM is used as a rewritable non-volatile memory, but the present invention is not limited thereto and is applicable to electrically rewritable non-volatile memories other than flash ROMs.

According to the present invention, it is possible to instantly rewrite data or correct programs under environmental conditions that are difficult to reproduce, and in particular, it is possible to easily perform optimization of programs and data tables in operating environments on actual vehicles when developing ECU.

Moreover, according to the present invention, since the clock for the CPU is stopped when the data in-the flash ROM is read from outside, external reading of the ROM data can be achieved without relying on the CPU configuration.

What is claimed is:

1. A data processing apparatus comprising:
   a CPU for executing a program for performing data processing;
   a rewritable non-volatile memory for storing data that are to be referred to at the time of the data processing;
   a RAM for storing data in a rewrite target region when rewriting the data stored in the non-volatile memory while the CPU is in operation;
   an external interface circuit for interfacing transfer of a control signal and data when the non-volatile memory is accessed from outside the data processing apparatus while the CPU is in operation; and
   a fetch bus interface circuit that is connected between the CPU, the non-volatile memory, and the external interface circuit, the fetch bus interface circuit having a data holding circuit therein, the data holding circuit being separate from the CPU and capable of temporarily holding data which are read out from the non-volatile memory when operation of the CPU is suspended prior to the non-volatile memory access being completed, and the holding circuit providing the data temporarily held therein to the CPU in response to resumption of the operation of the CPU and, thereafter, providing data read out from the memory to the CPU without temporarily holding the data therein, and controls, according to the control signal, a switching of a fetch bus between the non-volatile memory and the RAM when the non-volatile memory is accessed from outside the data processing apparatus while the CPU is in operation.

2. The data processing apparatus according to claim 1, wherein the fetch bus interface circuit has:
   a function of outputting a control signal for stopping an operating clock for the CPU when a command indicating data read-out of the non-volatile memory and an address value thereof are inputted from the external interface circuit;
   a function of holding, in the data holding circuit, data being output from the non-volatile memory at the time when the stop control signal for the operating clock is output;
   a function of reading data and outputting the data to the external interface circuit by supplying the address value to the non-volatile memory during the period in which the operating clock for the CPU is stopped; and
   a function of resuming the supply of the operating clock for the CPU and supplying the data held in the data holding circuit to the CPU, and thereafter, switching a data supply source to the CPU from the data holding circuit to the non-volatile memory side.

3. The data processing apparatus according to claim 2, wherein the non-volatile memory is a flash ROM.

4. The data processing apparatus according to claim 1, wherein the fetch bus interface circuit has:
   a function of switching an input destination of an address and a control signal for the non-volatile memory to the external interface circuit side in order to rewrite data in the non-volatile memory from outside;
   a function of switching, while data are written into a rewrite target region in the non-volatile memory, a target of fetching by the CPU to a predetermined storage region of the RAM in which data for the rewrite target region are copied and stored in advance; and
   a function of returning the target of fetching by the CPU to the non-volatile memory side after new data are written into the non-volatile memory.

5. The data processing apparatus according to claim 4, wherein the non-volatile memory is a flash ROM.

6. The data processing apparatus according to claim 1, wherein the fetch bus interface circuit has:
   a function of writing, when a command indicating rewriting of data to the non-volatile memory and an address value thereof are inputted, rewrite target data read out from an address of the non-volatile memory indicated by the address value into a predetermined storage region of the RAM;
   a function of switching, while data are written into the non-volatile memory, a target of fetching by the CPU to a predetermined storage region of the RAM; and
   a function of returning the target of fetching by the CPU to the non-volatile memory side after new data are written into the non-volatile memory.

7. The data processing apparatus according to claim 6, wherein the non-volatile memory is a flash ROM.

8. The data processing apparatus according to claim 1, wherein the fetch bus interface circuit has:
   a function of outputting a control signal for stopping an operating clock for the CPU when a command indicating data read-out of the non-volatile memory and an address value thereof are inputted from the external interface circuit; a function of holding, in the data holding circuit, data being output from the non-volatile memory at the time when the stop control signal for the operating clock is output; a function of reading data and outputting the data to the external interface circuit by supplying the address value to the non-volatile memory during the period in which the operating clock for the CPU is stopped; and a function of resuming the supply of the operating clock for the CPU and supplying the data held in the data holding circuit to the CPU, and thereafter, switching a data supply source to the CPU from the data holding circuit to the non-volatile memory side; and
   a function of switching an input destination of an address and a control signal for the non-volatile memory to the external interface circuit side in order to rewrite data in the non-volatile memory; a function of switching, while data are written into the non-volatile memory, a target of fetching by the CPU to a predetermined storage region of the RAM in which data for the rewrite target region are copied and stored in advance; and a function of returning the target of fetching by the CPU to the non-volatile memory side after new data are written into the non-volatile memory.

9. The data processing apparatus according to claim 8, wherein the non-volatile memory is a flash ROM.

10. The data processing apparatus according to claim 1, wherein the fetch bus interface circuit has:

a function of outputting a control signal for stopping an operating clock for the CPU when a command indicating data read-out of the non-volatile memory and an address value thereof are inputted from the external interface circuit; a function of holding, in the data holding circuit, data being output from the non-volatile memory at the time when the stop control signal for the operating clock is output; a function of reading data and outputting the data to the external interface circuit by supplying the address value to the non-volatile memory during the period in which the operating clock for the CPU is stopped; and a function of resuming the supply of the operating clock for the CPU and supplying the data held in the data holding circuit to the CPU, and thereafter, switching a data supply source to the CPU from the data holding circuit to the non-volatile memory side; and a function of writing, when a command indicating rewriting of data to the non-volatile memory and an address value thereof are inputted, rewrite target data read out from an address of the non-volatile memory indicated by the address value into a predetermined storage region of the RAM; a function of switching, while data are written into the non-volatile memory, a target of fetching by the CPU to a predetermined storage region of the RAM; and a function of returning the target of fetching by the CPU to the non-volatile memory side after new data are written into the non-volatile memory.

11. The data processing apparatus according to claim 10, wherein the non-volatile memory is a flash ROM.

12. A data processing method for a data processing apparatus comprising a CPU for executing a program for performing data processing, and a rewritable non-volatile memory for storing data that are referred to at the time of the data processing, in which the non-volatile memory is permitted to be read from outside the data processing apparatus while the CPU is in operation, the method comprising:

stopping an operating clock for the CPU when a command indicating data read-in to the non-volatile memory and an address value are inputted from outside the data processing apparatus;

holding, in a data holding circuit, the data being output from the non-volatile memory at the time when the operating clock is stopped;

reading and outputting data to outside by supplying the address value to the non-volatile memory during the period in which the operating clock for the CPU is stopped;

resuming the operating clock for the CPU;

supplying the data held in the data holding circuit to the CPU; and switching, according to a completion of the reading and outputting of data to outside, a data supply source for the CPU from the data holding circuit to the non-volatile memory.

13. A data processing method for a data processing apparatus comprising a CPU for executing a program for performing data processing, and a rewritable non-volatile memory for storing data that are referred to at the time of the data processing, and a data holding circuit, which is separate from the CPU and which is capable of temporarily holding data which are read out from the non-volatile memory when operation of the CPU is suspended prior to the non-volatile memory access being completed, and the holding circuit providing the data temporarily held therein to the CPU in response to resumption of the operation of the CPU and, thereafter, providing the data read out from the memory to the CPU without temporarily holding the data therein, in which the non-volatile memory is permitted to be rewritten from outside the data processing apparatus while the CPU is in operation, the method comprising the steps of:

storing data that are stored in a rewrite target region in the non-volatile memory into a predetermined storage region in the RAM that is provided separately from the non-volatile memory;

inputting an address of the rewrite target region in the non-volatile memory and a control signal from outside the data processing apparatus;

switching a target of fetching by the CPU to the predetermined storage region in the RAM;

performing data writing into the rewrite target region in the non-volatile memory; and returning the target of fetching by the CPU to the non-volatile memory side after the data writing to the non-volatile memory is completed.

14. A data processing apparatus comprising:

a memory storing data;

a CPU coupled to the memory to perform a memory access in which data is read out from the memory and then fetched into the CPU; and a fetch bus interface circuit coupled between the CPU and the memory, the fetch bus interface circuit temporarily holding therein the data read out from the memory when operation of the CPU is suspended prior to the memory access being completed, and the fetch bus interface circuit providing the data temporarily held therein to the CPU in response to resumption of the operation of the CPU and, thereafter, providing the data read out from the memory to the CPU without temporarily holding the data therein.

15. The apparatus as claimed in claim 14, wherein the fetch bus interface circuit has a data holding circuit that temporarily holds therein the data read out from the memory and a switch circuit coupled among the CPU, the memory and the data holding circuit to form a data path from the memory to the CPU before the operation of the CPU is suspended and a data path from the data holding circuit to the CPU in response to resumption of the operation of the CPU.

16. The apparatus as claimed in claim 14, farther comprising an external interface circuit, and the operation of the CPU is suspended by the external interface circuit, and the external interface circuit perform data access operation on the memory during suspension of the operation of the CPU.

17. The apparatus as claimed in claim 16, wherein the operation of the CPU is suspended in response to a command that is issued by the external interface circuit to perform data access operation on the memory.

18. The data process apparatus as claimed in claim 14, wherein the memory is a non-volatile memory.

* * * * *